(12) United States Patent
Desineni et al.

(10) Patent No.: US 8,566,059 B2
(45) Date of Patent: Oct. 22, 2013

(54) INSERTION OF FAULTS IN LOGIC MODEL USED IN SIMULATION

(75) Inventors: Rao H. Desineni, Essex Junction, VT (US); Maroun Kassab, Essex Junction, VT (US); Mary P. Kusko, Poughkeepsie, NY (US); Leah M. Pastel, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 12/633,151

(22) Filed: Dec. 8, 2009

(65) Prior Publication Data

US 2011/0137602 A1    Jun. 9, 2011

(51) Int. Cl.
   *G06F 17/50*    (2006.01)
   *G01R 31/00*    (2006.01)

(52) U.S. Cl.
   USPC .......................................... 702/117; 716/136

(58) Field of Classification Search
   USPC .............. 702/57–59, 117; 716/103, 106, 132, 716/136; 714/47.1, 47.2, 25; 703/4, 14
   See application file for complete search history.

(56) References Cited

U.S. PATENT DOCUMENTS

| | | | |
|---|---|---|---|
| 5,438,524 A | 8/1995 | Komoda | |
| 5,537,580 A | 7/1996 | Giomi et al. | |
| 6,096,092 A | 8/2000 | Takahashi et al. | |
| 7,020,853 B2 | 3/2006 | Skoll et al. | |
| 7,051,310 B2 * | 5/2006 | Tsao et al. | 716/114 |
| 7,512,508 B2 * | 3/2009 | Rajski et al. | 702/118 |
| 2004/0015806 A1 * | 1/2004 | Frank et al. | 716/13 |
| 2004/0117750 A1 | 6/2004 | Skoll et al. | |
| 2007/0234161 A1 | 10/2007 | Blanton et al. | |
| 2007/0271543 A1 * | 11/2007 | Alpert et al. | 716/13 |
| 2008/0010624 A1 | 1/2008 | Lin et al. | |

FOREIGN PATENT DOCUMENTS

| | | |
|---|---|---|
| JP | 09-054145 | 2/1997 |
| JP | 2005-265497 | 9/2005 |

OTHER PUBLICATIONS

Huang, S., "Diagnosis of Byzantine Open-Segment Faults," IEEE Computer Society, Proceedings of the 11th Asian Test Symposium (ATS'02), 2002, pp. 1-6.

* cited by examiner

*Primary Examiner* — Marc Armand
*Assistant Examiner* — Ricky Ngon
(74) *Attorney, Agent, or Firm* — Gibb & Riley, LLC; Michael J. LeStrange, Esq.

(57) ABSTRACT

A method of selecting fault candidates based on the physical layout of an Integrated Circuit (IC) layout, that includes, identifying failing observation points in an IC layout, determining the failing observation points proximity geometry in the IC circuit layout, determining if a proximity criteria for the failing observation points is met, and identifying faults associated with the failing observation points that meet the proximity criteria; and including the identified faults in a fault candidate set.

25 Claims, 14 Drawing Sheets

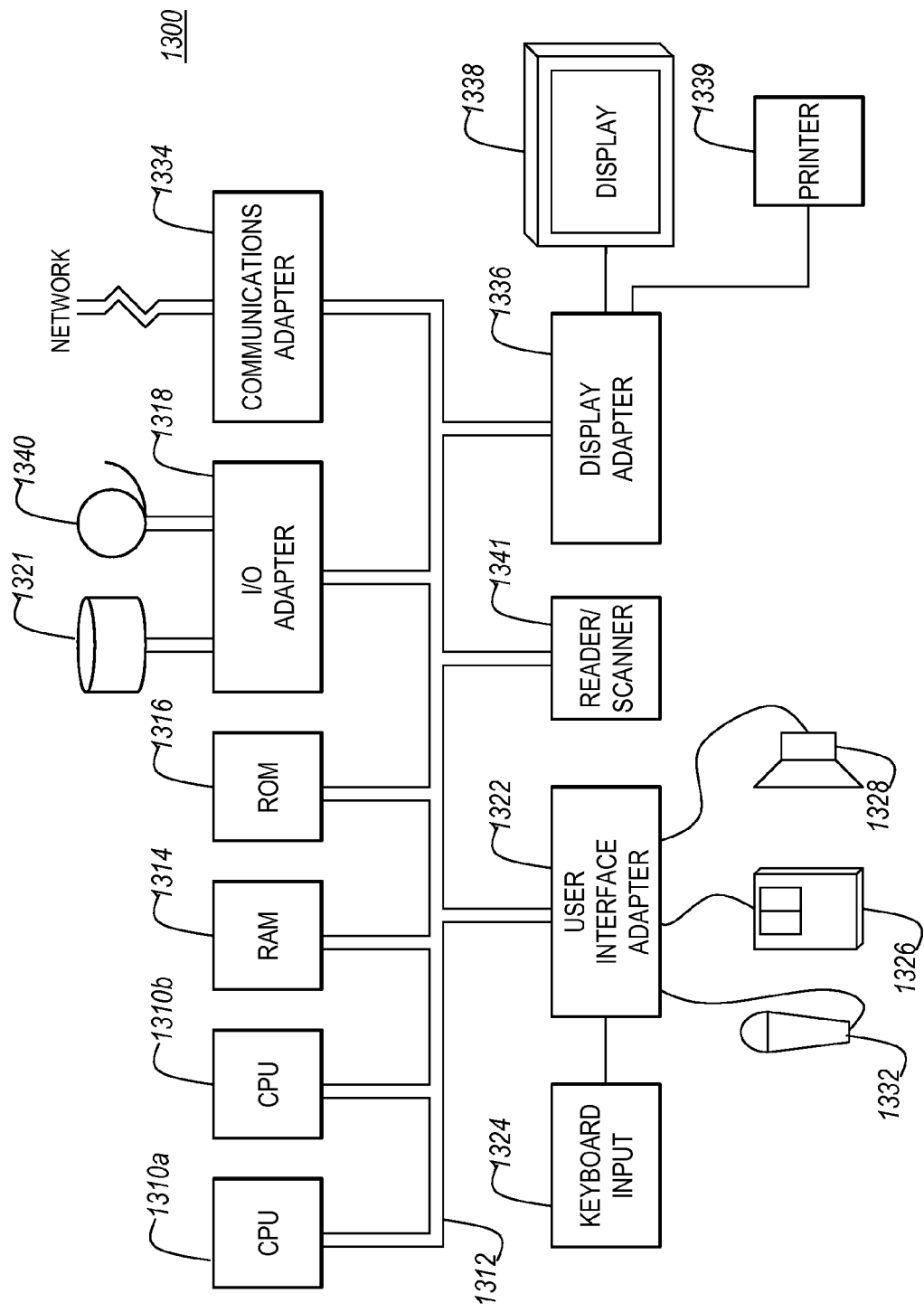

INSERTION OF FAULTS IN LOGIC MODEL USED IN SIMULATION

BACKGROUND OF THE INVENTION

1. Field of the Invention

The present invention generally relates to improving integrated circuit logic diagnostics by modeling physical layout information in the models used for diagnostic simulation and defect localization. An embodiment of the invention uses net connectivity information from integrated circuit layout to improve logic diagnostics and a heuristic method for determining when to include faults associated with clock or control signals in the fault candidate set for diagnostics.

2. Description of the Related Art

Modeling for test generation and diagnostic simulation uses logical test models, which model circuit logic and logical connectivity. Electrical behavior is typically modeled by stuck-at faults, transition faults or by adding patterns faults. Layout information may be indirectly included in the test netlist by customizing faults for a particular circuit. A physical defect mechanism can be mapped to electrical or logical behavior using default struck-at faults, pattern faults or composite faults. For example, mux circuits are often modeled by a mux primitive plus some pattern faults to get full coverage of the fail space for the circuit.

Gatemaker™ is an internal IBM® EDA tool. It may be used to create a gate level model directly from the layout to get accurate transistor level connections. Gatemaker™ improves the model to layout correspondence by better modeling the logic implementation. However, none of these methods include net structure in the model.

Diagnostics simulation, e.g., Cadence™ Encounter Test™, identifies a group of candidate faults that might explain the fail data from the chip being diagnosed. Test patterns are simulated for each fault and the resulting score is used to identify the faults most likely to explain the fail data. In the situation seen in FIG. 2, a net fans out to four downstream circuits, two fanouts pass test and two fanouts fail test. Current diagnostic simulation, using stuck-at faults, cannot identify a single fault which will explain this behavior.

Commercial diagnostics tools, (like the Cadence™ Encounter Test™), calculate scores for each fault candidate based on how many failing and passing measures are explained, or not explained by the particular fault. In the above example referring to FIG. 2, none of these faults would score perfectly; none of these faults would completely explain the fail data. Scores are used as a metric to identify chips for further analysis, rank candidate faults in the diagnostic callout, as well as to localize the faulty logic.

SUMMARY OF THE INVENTION

In view of the foregoing and other exemplary problems, drawbacks, and disadvantages of the conventional methods and structures, an exemplary embodiment provides a computer-implemented method of selecting fault candidates based on the physical layout of an Integrated Circuit (IC) layout that identifies, by a computing device, failing observation points in an IC layout. Failing observation point's proximity geometry is determined in the IC circuit layout, and if proximity criteria for the failing observation points are determined to be satisfied, faults associated with the failing observation points that meet the proximity criteria are determined. The identified faults are then included in a fault candidate set.

Another exemplary embodiment provides a computer-implemented method that determines, by a computing device, net connectivity of a circuit using layout extraction. A buffer insertion point is determined based on the net connectivity, and a buffer model is inserted at the buffer insertion point in a test netlist. A fault model is updated based on the test netlist with the inserted buffer model.

Another exemplary embodiment of the invention provides a computer-implemented method including performing, by a computing device, a conetrace on a logic test netlist of an Integrated Circuit (IC) with fail data to identify one of fail faults, nets and instances within the circuit. Net connectivity is determined of the fail candidates using layout extraction, where a buffer insertion point is determined within the circuit based on the net connectivity. A buffer model is inserted at the buffer insertion point in the test netlist, and a fault model is updated based on the test netlist. Finally, a diagnostic result is output based on a diagnostic simulation of the updated fault model.

With these novel features, the embodiments of the invention use the novel concept of adding physical information by adding logic elements to the netlist, rather than creating pattern faults or changing the simulator. This has the advantages of not requiring any enhancements to general purpose simulators or creation of specialized pattern faults, yet provides a precise fault callout.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 13 illustrates a representative schematic diagram of hardware environment for practicing the embodiments of the invention.

DETAILED DESCRIPTION OF EXEMPLARY EMBODIMENTS OF THE INVENTION

Figure 1:
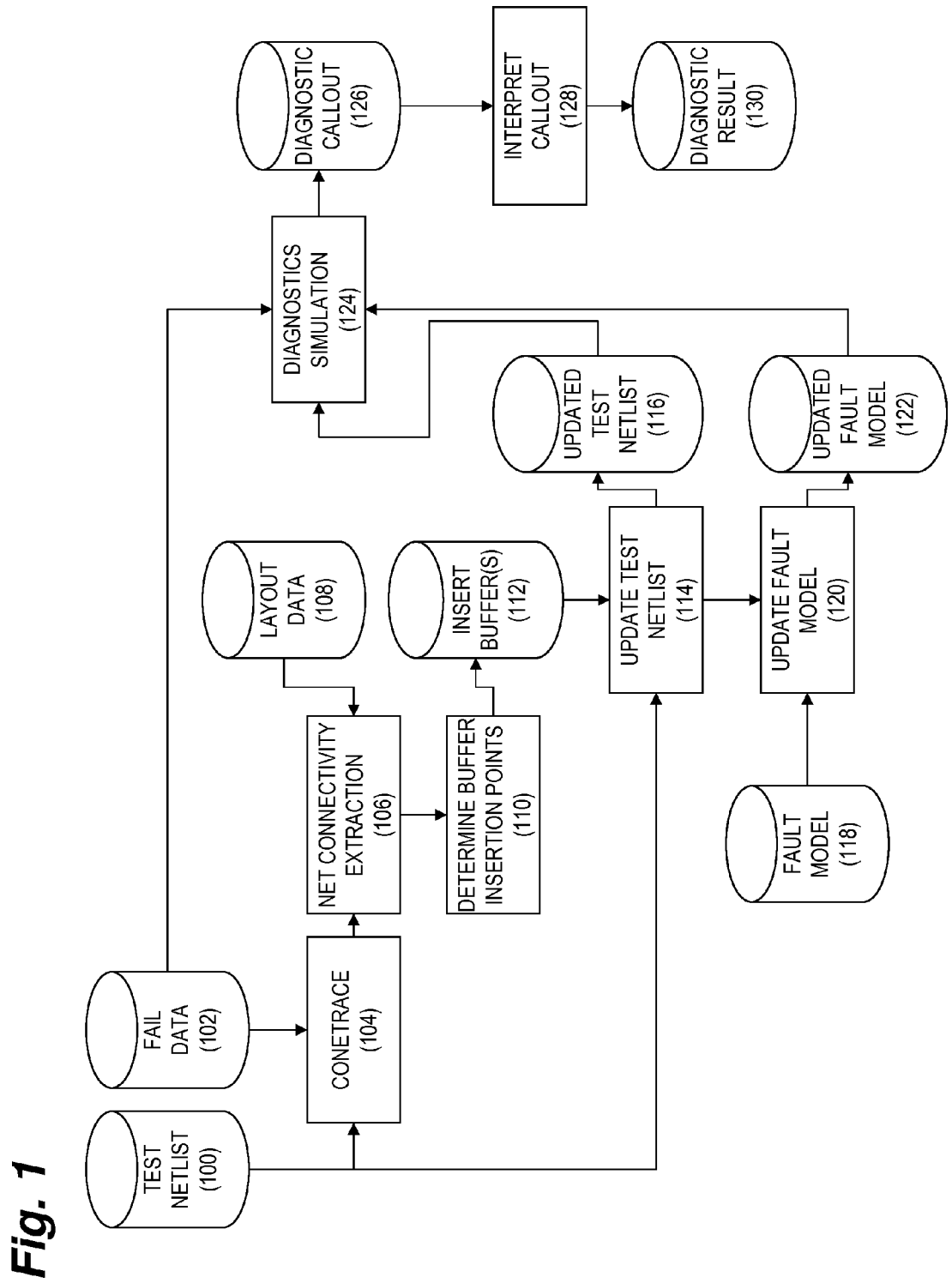
FIG. 1 illustrates is a flow diagram of an embodiment of the invention.

Referring now to the drawings, and more particularly to FIGS. 1-13, there are shown exemplary embodiments of the method and structures of the embodiments of the invention.

Overview

The semiconductor industry has a growing reliance on diagnostics and defect localization to provide feedback to manufacturing for yield learning. Functional analysis directed by diagnostics produces defect root causes linked to the electrical test failure.

Diagnostics is used to determine possible defect locations in ICs. Volume diagnostics produces diagnostics results from a large number of chips and is used in several ways: 1) diagnostics data analysis, i.e., failure analysis root cause determination; 2) design or system debug; 3) random defect directed failure analysis (FA) and pareto generation for fabrication feedback; and 4) logic mapping, by overlaying PLY inspection data and diagnostics results. The number of nets and circuits called out and the accuracy of the diagnostics callout may be compromised for computing speed in volume diagnostics. Improved diagnostics may enable different trade-offs between speed, accuracy, and number of chips diagnosed and ultimately improve yield learning.

Volume diagnostics software applications are available to support routine uses above. These applications output diagnostics results from many chips at a time. Generally, speed and throughput are balanced with accuracy in setting up volume diagnostics. The routine uses of volume diagnostics are not usually compromised by this trade-off. Volume diagnostics results may be supplemented with more careful or complete diagnostics if necessary. Volume diagnostics allows a choice between many chips for FA submissions, and chips with sufficient diagnostic callouts may be selected.

As volume diagnostics becomes more readily available, more uses for volume diagnostics results are evolving, which may have different diagnostics quality requirements than in the past. Also, semi-conductor design and fabrication technology continue to evolve. Trade-offs that were reasonable in the past are starting to limit which failing chips complete diagnostics, which in turn, could limit which problems are represented in the diagnostics results.

For example, setting a maximum number of faults to process during diagnostics prevents diagnosing chips that have more fault candidates than the limit. In a design dependent world, this could translate to filtering out the chips that fail a certain type of macro or logic formation. The size of this sample may become proportionally larger depending on chip design styles and technology implementation guidelines.

Another example is setting diagnostics to exclude clock faults. There are often substantial faults associated with clock and select or enable signal trees. To minimize processing times, fault selection for diagnostics may be limited to faults in the backcones of observation latch functional data ports. One consequence of filtering out clock or global control signal faults is poor diagnostic results for particular chips, which have defects in the excluded circuitry. Another consequence might be poor representation in the pool of well diagnosed chips of defects on particular levels or with specific physical structures associated with clock or global control signal trees.

The embodiments of the invention model physical information by adding logic elements to the netlist and/or using layout based criteria to select candidate faults for diagnostic simulation. The embodiments of the invention do not require changing or creating new pattern faults, although the embodiments of the invention could accommodate both. This has the advantages of not requiring any enhancements to general purpose simulators or creation of specialized pattern faults, yet provides a precise fault callout.

Exemplary Aspects

Referring again to the drawings, FIG. 1 is a flow diagram of an embodiment of the invention illustrating the process of performing net connectivity based update in an on-demand scheme. Given a logic test netlist 100 and fail data 102, a conetrace 104 is performed to identify the part of the test netlist that could explain the fail data 102.

Given the layout data 108, net connectivity is determined 106, using layout extraction. This layout extraction is explained in more detail in FIGS. 5-7. Buffer insertion points are determined 110 from the determined net connectivity 106. The determination of buffer insertion points is explained in more detail in FIGS. 2-4, and 7. A dictionary of net insertion points for some or all nets may be created or appended at this point. A dictionary of net insertion points could be used in step 110 to determine buffer insertion points.

A test netlist 116 is updated 114 by adding buffers at insertion points 112 representing physical net branch points, and thereafter a fault model 118 may be updated 120, as necessary to include faults associated with net physical layout. Diagnostics simulation 124 may be performed with the updated test netlist 116 and the updated fault model 122.

Diagnostic results/callout 126 may be interpreted 128 in terms of net connectivity, when they include faults associated with inserted buffers and thus modified nets. This step may not be necessary depending on the end use of the diagnostic results. Finally, a diagnostic result 130 is produced and output.

Figure 2:
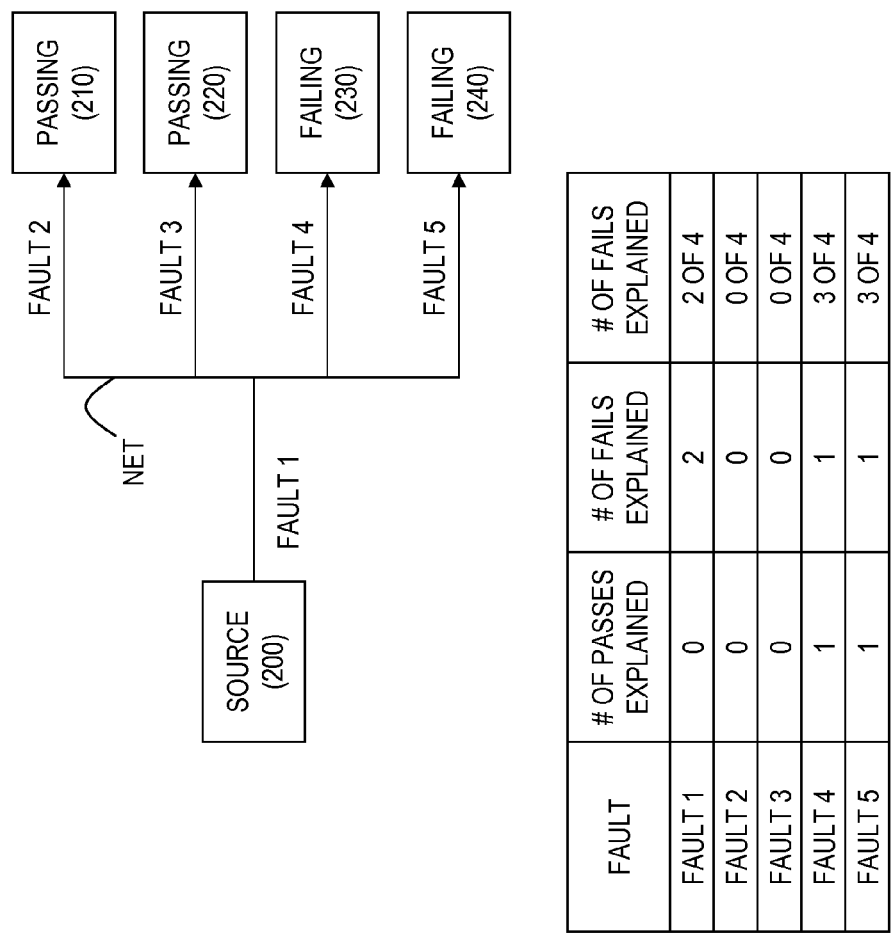
FIG. 2 illustrates a logic model of a net.
Figure 3:
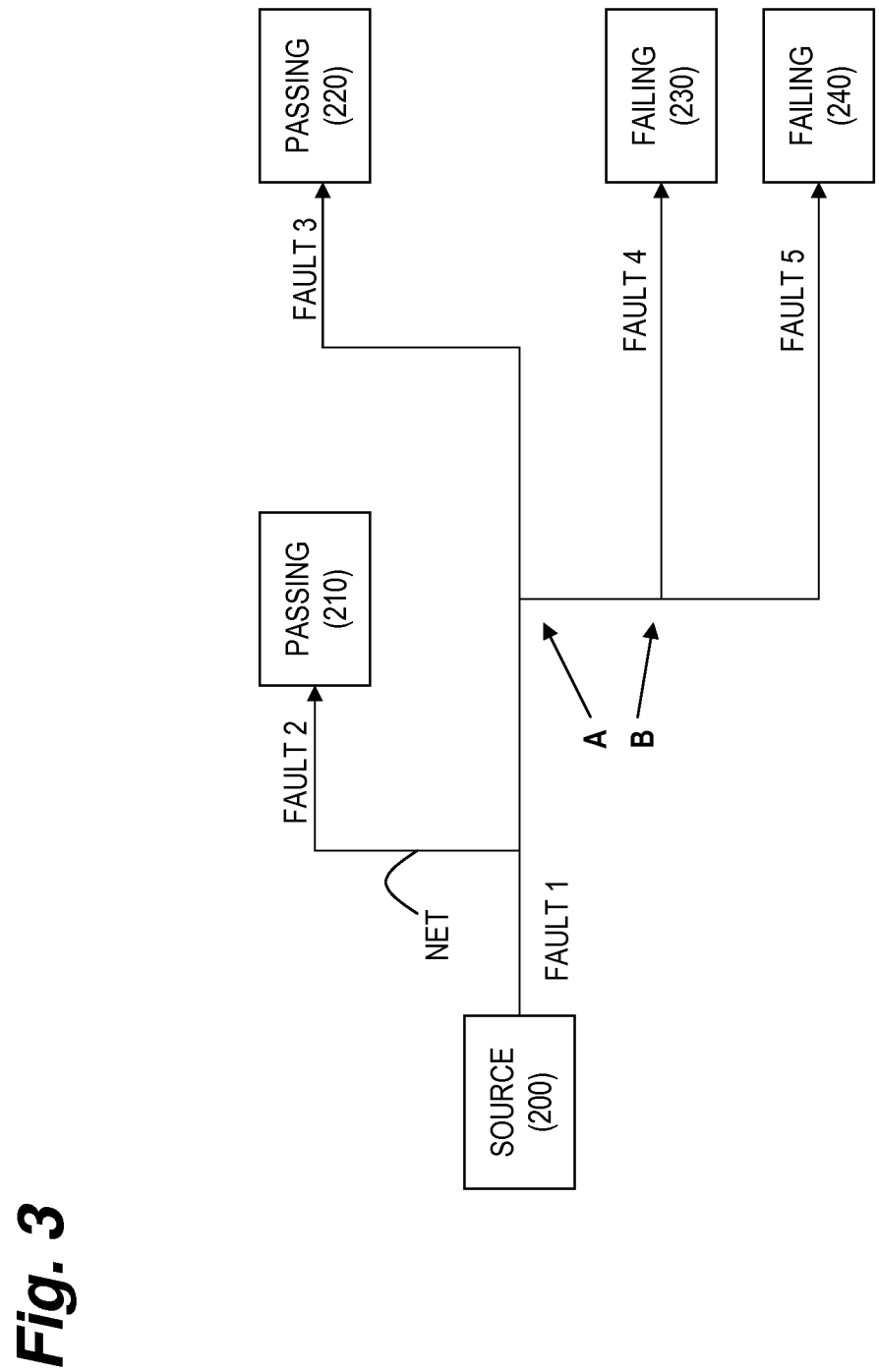
FIG. 3 illustrates a physical model of a net.
Figure 4:
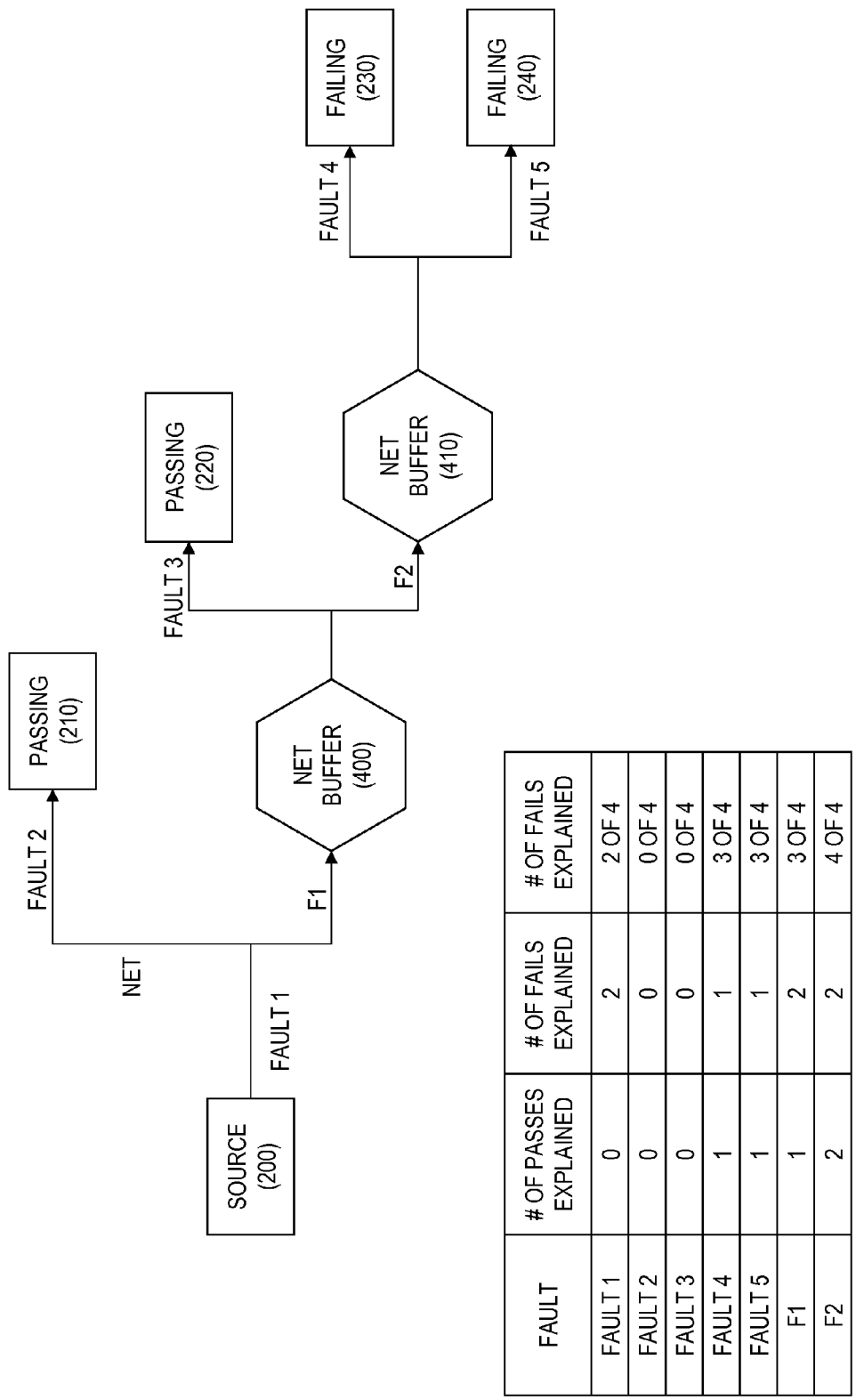
FIG. 4 illustrates a logic model of a net which includes elements representing physical connectivity.

FIGS. 2-4 illustrate a physical connectivity of a logical net including a source 200 that feed passing latches 210 and 220 and failing latches 230 and 240. Again, commercial diagnostics tools calculate scores for each fault candidate based on how many failing and passing measures are explained, or not explained by the particular fault. In FIG. 2, none of these faults would score perfectly as illustrated by the fault explanation table, thus, none of these faults would completely explain the fail data of latches 230 and 240.

FIG. 3 depicts the physical connectivity of the logical net shown in FIG. 2. From FIG. 3, it can be seen that the test pass and fail results could be explained by an open defect in the net between points A or B, and perhaps, by a short defect somewhere on the net downstream of point A, closer to the two failing fanouts at B. An embodiment of the invention includes physical connectivity of the net in the netlist.

FIG. 4 illustrates where branch points are replaced in the model by buffer elements 400 and 410. Buffer elements may have a unique name to indicate what they represent in the diagnostics results (e.g., NET_BUFFER 400 and NET_BUFFER 410). Their models include appropriate faults. FIG. 4 shows a new model of the net in FIGS. 2 and 3. In this model, each branch of the net has a single logic element with faults that represent the particular branch of the net. Diagnostics using this model would identify fault F2 as the fault candidate that completely explains the fail data. F2 would have a 100% score, using the Cadence™ ET™ score calculation. F2 could be mapped to sub-net defect location for failure analysis or other diagnostic callout analysis.

Figure 5:
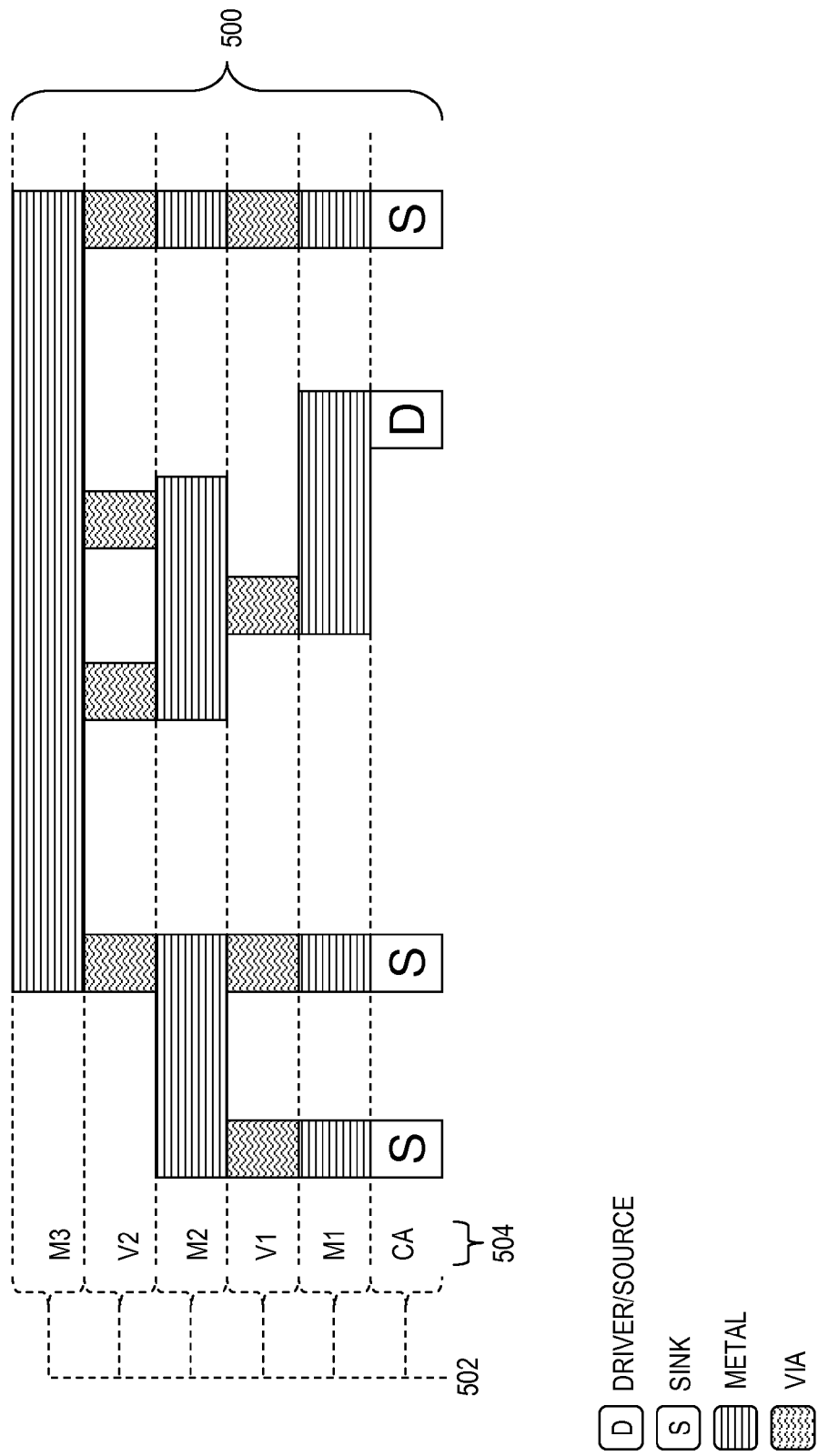
FIG. 5 illustrates physical connections made by physical manufacturing process layers.
Figure 6:
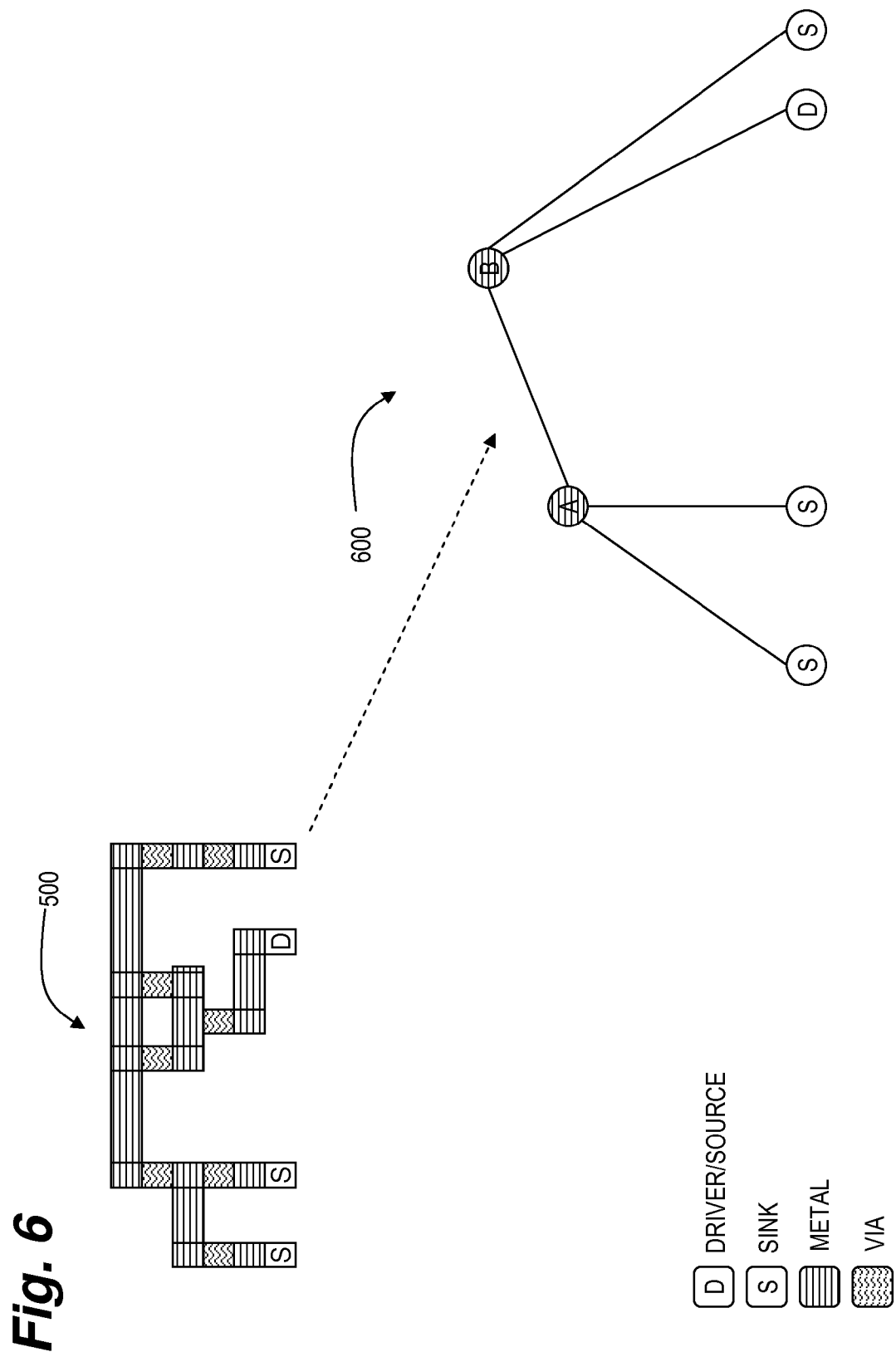
FIG. 6 illustrates correspondence between physical connectivity and a graph representation.
Figure 7:
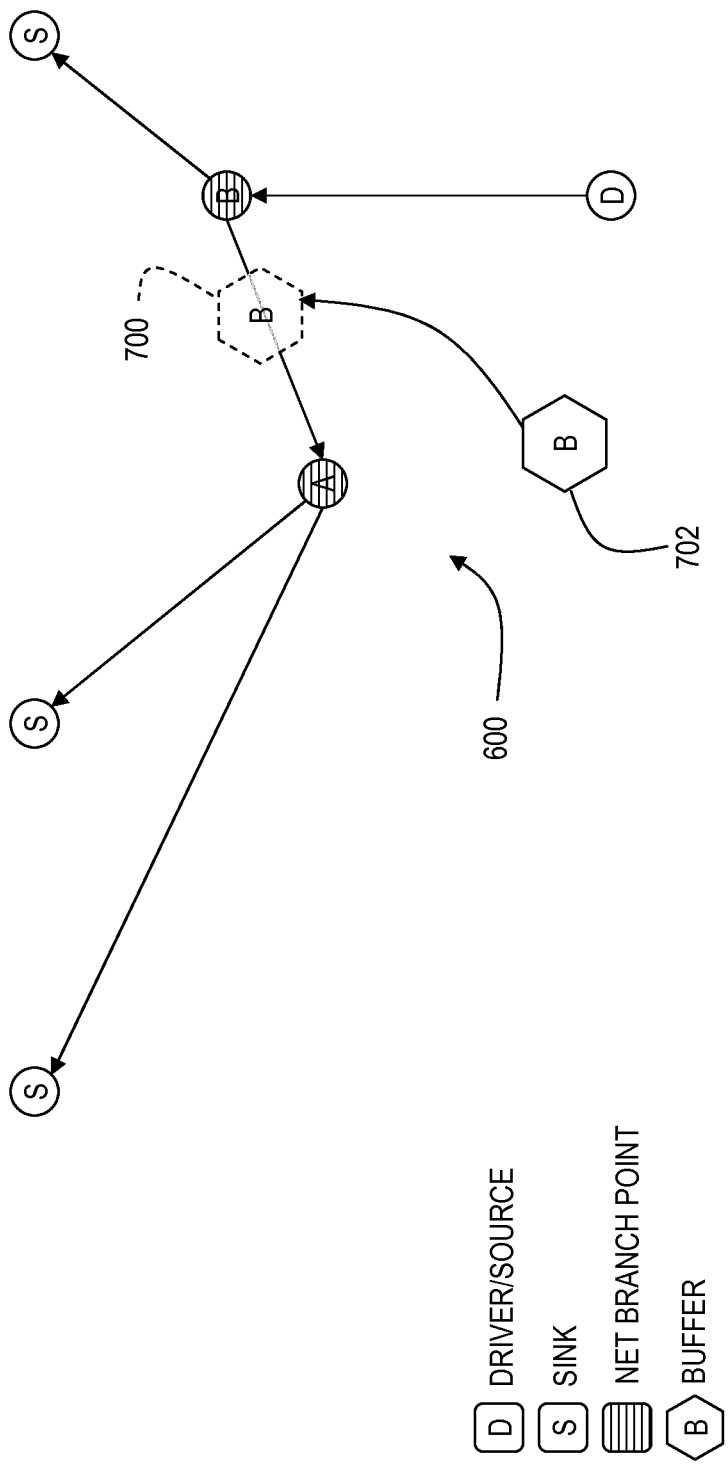
FIG. 7 illustrates a process of determining buffer insertion points from net connectivity and inserting buffer elements into a netlist.

FIGS. 5-7 illustrate a net connectivity extraction process referring to the net connectivity extraction step 106 from FIG. 1 that is necessary to determine where to insert buffers between nodes for diagnostic simulation.

FIG. 5 illustrates the physical layout cross section wiring shapes and connection points of a net 500 and shows net connectivity with a number of layers 502 including a CA layer containing sinks S and a driver D, metal wiring levels M1, M2 and M3, and via layers V1 and V2 504. This layout cross section 500 sets up the extraction of the shape connection points for the net as further described below.

FIG. 6 shows the simplified connection graph 600 for net 500. Graph 600 is constructed by simplifying a complete graph for net 500 by reducing and removing non-articulation points for redundant paths and stubs, as well as removing single-input-single-output nodes. Graph construction and simplification are included in the field of Graph Theory literature.

Connectivity graph 600 includes a driver D, and a sink S connected to an intermediate node B, and an intermediate node A connected to intermediate node B, and two sinks S.

FIG. 7 illustrates determining buffer insertion points from the net connectivity simplification of FIGS. 5-7 by "walking" the simplified nodal graph and inserting buffers to model connectivity. Starting at the net source, (driver D), the process identifies the 1st downstream net branch point B. If the number of downstream fanouts is less than three (3), the process stops. If the number of downstream fanouts is greater than or equal to three (3), then each downstream branch with greater than one (1) fanout, is determined to be a buffer insertion point 700, in this example, between nodes A and B, where a NET_BUFFER ("B") element 702 may be inserted therebetween in the model. This buffer identification and insertion process is looped starting from each new buffer insertion point.

Thus, the embodiment of the invention models physical information in the layout. Net branch points are modeled by adding logic elements, (i.e., buffers), to the netlist at buffer insertion points. This embodiment of the invention may also be embodied as: 1) creating a full or partial dictionary for an integrated circuit combining steps 106 and 110 in FIG. 1; 2) updating the test netlist and fault model before running diagnostics combining steps 106, 110, 112, 114, and 120 in FIG. 1 and running diagnostic simulation using the resulting test netlist and fault model; or 3) a combination of 1) and 2).

Figure 8:
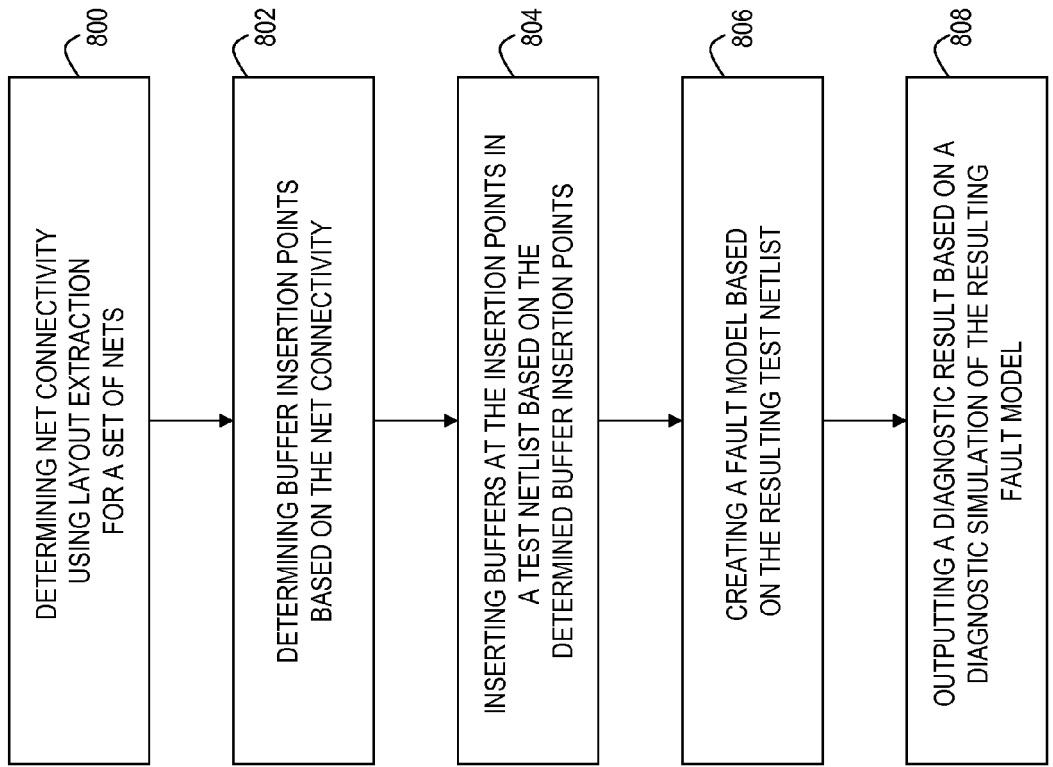
FIG. 8 illustrates a method of the invention.

FIG. 8 illustrates a computer-implemented method including determining net connectivity for a set of nets within an integrated circuit using layout extraction 800, determining buffer insertion points for the set of nets based on the determined net connectivity 802, and inserting buffers for nets within the set of nets into a test netlist at the determined insertion points 804. A fault model may be updated based on the test netlist 806. Thereafter, a diagnostic result is output by a computing device based on a diagnostic simulation of the resulting test netlist and fault model 808.

Determining the buffer insertion point, as illustrated in FIG. 8 step 802, may further include starting at a net source or driver, identifying, by a computing device, a first downstream net branch point. Then determining, by a computing device, if the first downstream net branch point contains more than one fanout and inserting a buffer insertion point at each downstream branch with more than one fanout. The buffer insertion point determination may also include, starting at the inserted buffer insertion point, identifying, by a computing device, another downstream net branch point. If it is determined, by a computing device, that the other downstream net branch point contains more than one fanout, a buffer insertion point is inserted at each downstream branch with more than one fanout.

Determining net connectivity of a circuit using layout extraction may further include building, by a computing device, a connectivity network of the circuit as a graph.

Determining net connectivity of a circuit using layout extraction further includes simplifying the graph, by a computing device.

Figure 9:
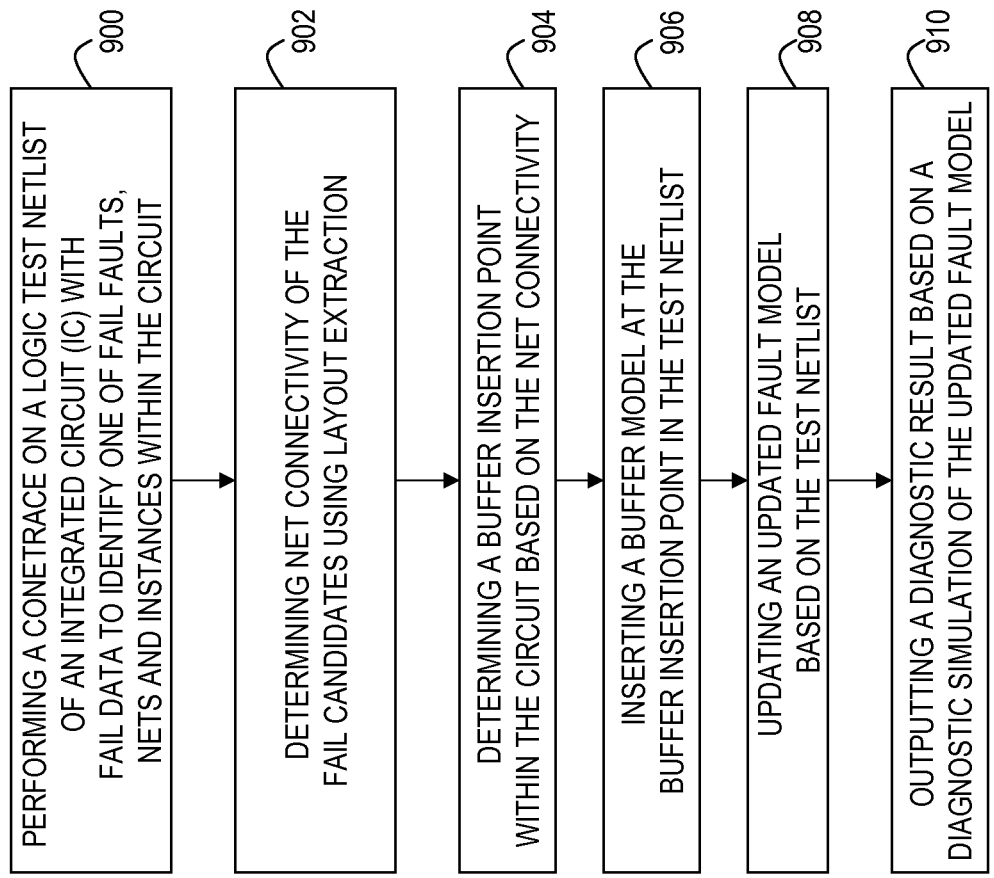
FIG. 9 illustrates a method of the invention.

FIG. 9 illustrates a computer-implemented method of performing a conetrace on a logic test netlist of an Integrated Circuit (IC) with fail data to identify one of fail faults, nets and instances within the circuit 900. Net connectivity is determined of the fail candidates using layout extraction 902. A buffer insertion point is determined within the circuit based on the net connectivity 904. A buffer model is inserted at the buffer insertion point in the test netlist 906. A fault model is updated based on the test netlist 908, and a diagnostic result is output based on a diagnostic simulation of the updated fault model 910.

Figure 10:
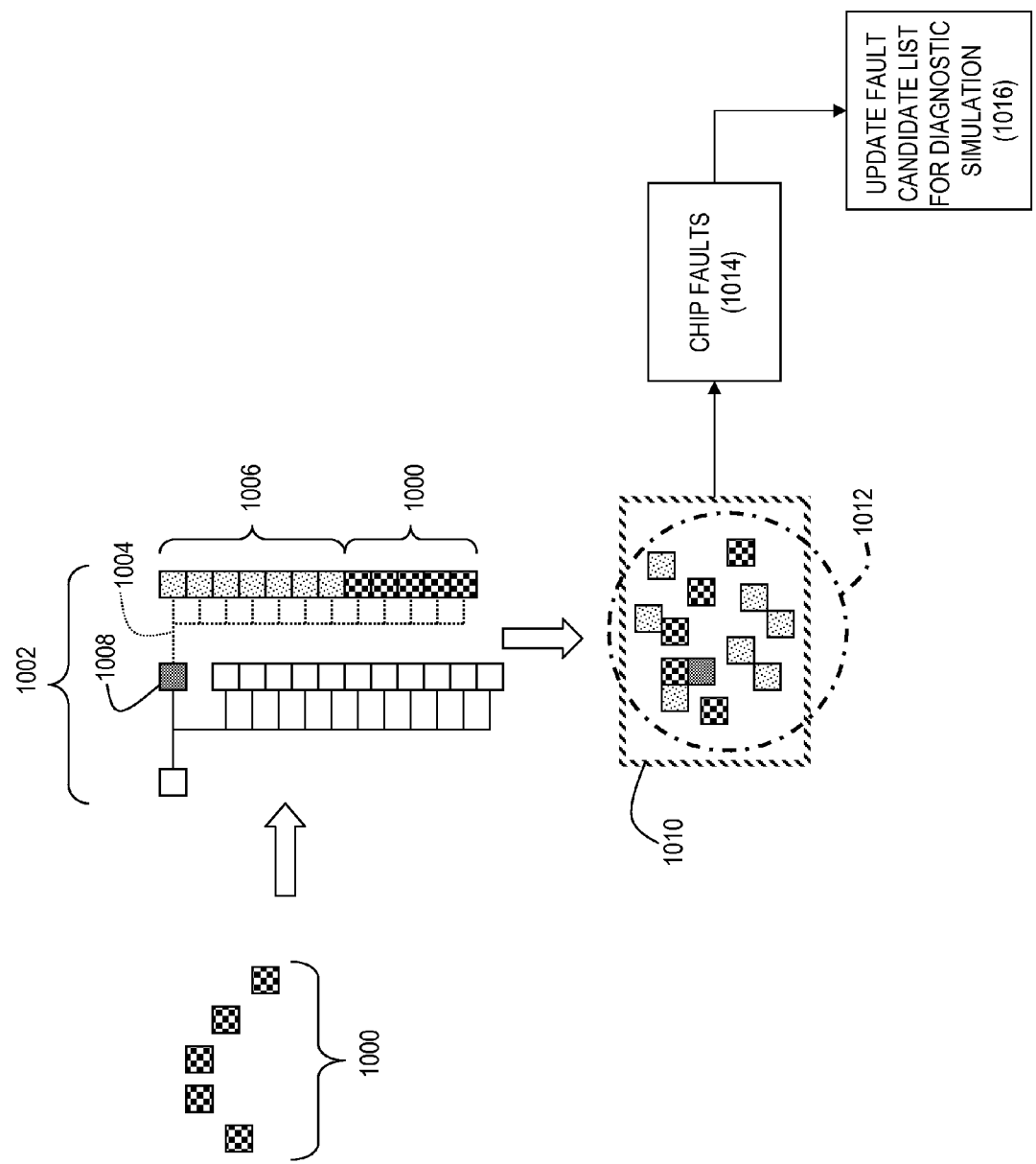
FIG. 10 illustrates a method using physical proximity as a heuristic for including faults.

FIG. 10 illustrates another aspect of an exemplary embodiment of the invention, which includes a heuristic method to determine when to include faults associated with clock or control signals in the fault candidate set for diagnostic simulation. An initial determination is made, based on the number of failing latches, whether a common clock or control signal could likely explain the fail. Physical placement of latches or other observation points in the layout is determined. Clock and control signal (i.e., scan enable) logic, stages, and nets may be analyzed to determine whether and where a defect may be possible or probable, as well as which stage or branch is susceptible, based on logical net connectivity, physical net connectivity, or proximity of the failing observation points. Proximity calculations and criteria could be implemented using a dictionary to store related latches where clusters of latches are stored relative to a branch associated with a similar clock or control signal. This may be included in a data prep step by identifying which scan latches are nearby each other. Alternately, a neighborhood calculation might also be based on measuring distances between latches and/or other observation points in the layout or floor plan of the integrated circuit.

Models for global nets including clock and/or control signal nets may be updated to reflect physical net connectivity as described previously.

Additionally, faults associated with shorts to power or ground might also be included based on a proximity measurement or lookup to power bussing.

FIG. 10 illustrates a number of failing latch and sink data 1000 in a netlist of a circuit 1002. A common clock or control signal net 1004 is identified that comes from a common source node 1008 and may have non-failing (passing) latches and sinks 1006 additionally associated with it (included for illustration purposes). The latches and sinks are located within the physical layout or floor plan 1010. The proximity criteria are depicted as circle 1012. Specific faults 1014 associated with the failing latches and sinks and/or other circuits and nets that fall within circle 1012 are included in the fault candidate set for diagnostic simulation. Specific faults 1014 diagrams this decision by intersecting the latch and sink locations with circle 1012 graphically. Proximity calculations are not limited to graphic implementations. Latch or sink or relative locations or their relationships to each other may be determined. Some embodiments include dictionaries or lookup tables or placed or routed netlists or other data structures that may be used to derive proximity information. Proximity calculations and criteria may be partially based on physical distances between circuit elements, logical or physical net connectivity, circuit type, proximity to structures or elements of the integrated circuit or device, or proximity of elements identified using tracing of the logical or physical netlists.

Figure 11B:
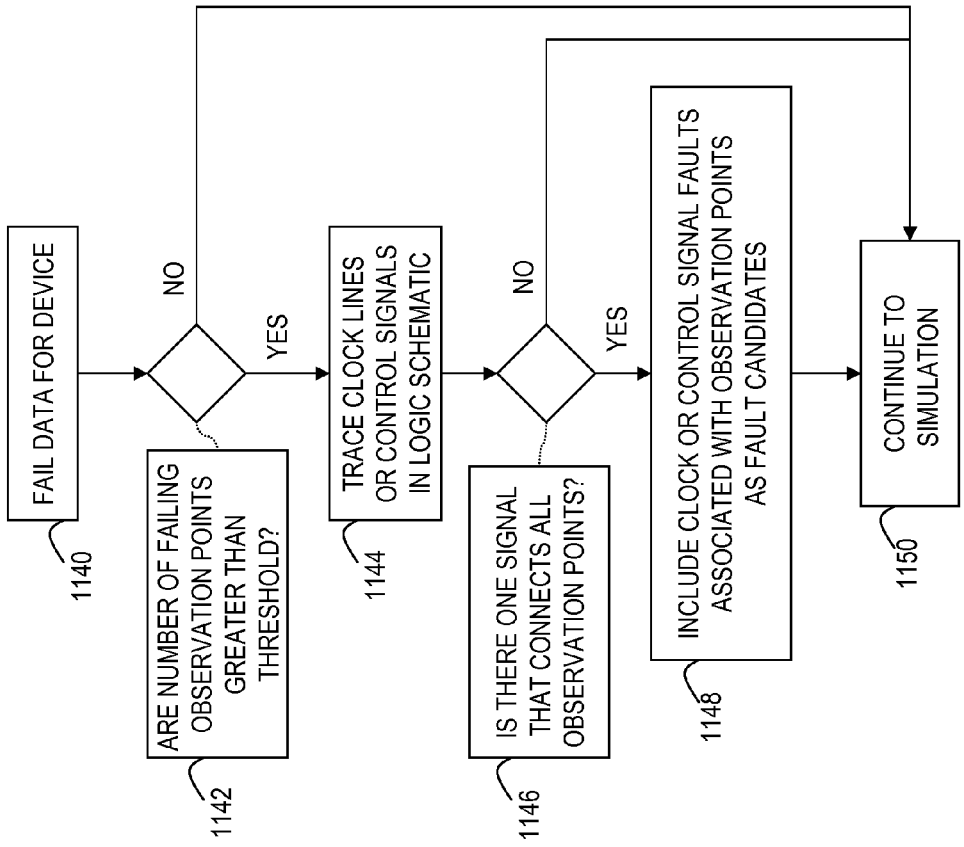
FIG. 11B illustrates a flow diagram for fault selection using logical connections.
Figure 11A:
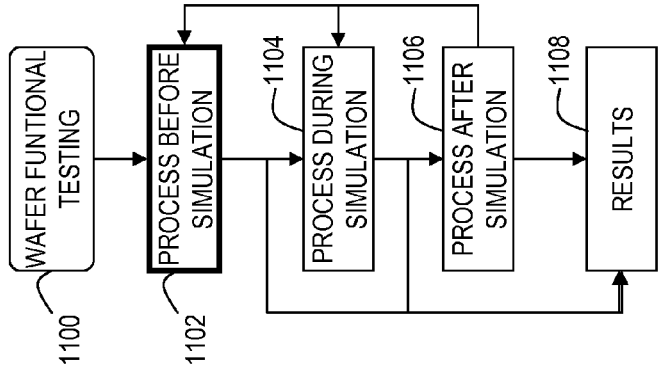
FIG. 11A illustrates stages of a diagnostic process.

FIG. 11A illustrates a generic flowchart for an integrated circuit diagnostic process 1100, showing pre-diagnostic simulation processing 1102, diagnostic simulation processing 1104, and post-diagnostic simulation processing 1106 that produces the results 1108 of the diagnostic simulation. Feedback from post-simulation processing 1106 may be fed back to pre-simulation processing 1102 and simulation processing 1104. Additionally, pre-simulation results 1102 and simulation results 1104 may be transmitted as diagnostic results 1108 without post-simulation processing 1106.

Figure 11D:
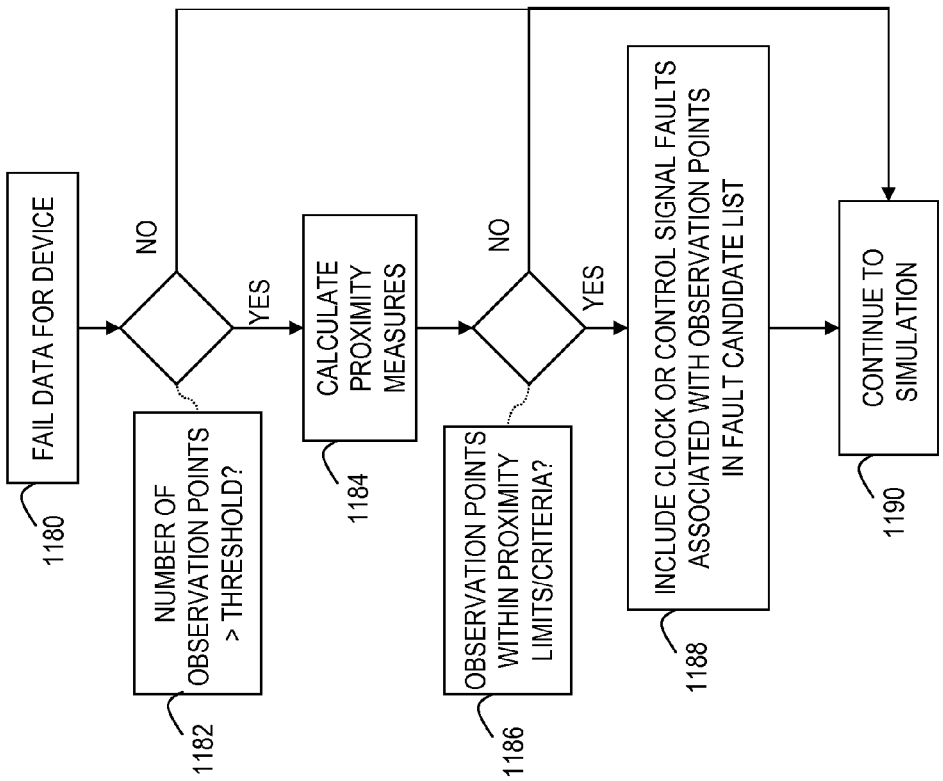
FIG. 11D illustrates a flow diagram for an embodiment using physical proximity.
Figure 11C:
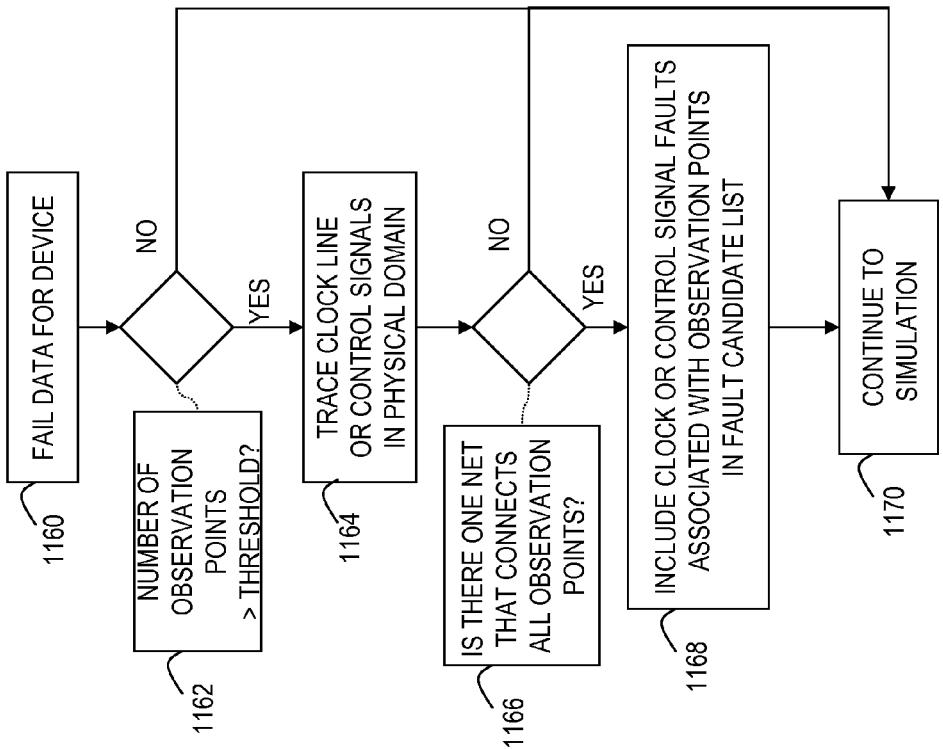
FIG. 11C illustrates a flow diagram for fault selection using number of observation points.

FIGS. 11B, 11C and 11D illustrate the process of determining if multiple failing observe points are connected to the same source within certain limitations and criteria. Before entering a simulation step, (for example, the process during simulation 1104 of FIG. 11A), a determination is made based on the number of failing latches whether a common clock or control signal could likely be defective. This determination may be done in a data preparation step, which would identify scan latches driven by a single branch of clock or control/SE signals. A dictionary may be created to store a cluster of latches with same clock or control, wherein a trace of clock lines would be performed as a "look up" operation to determine a common clock or control signal. Each of the below examples illustrate embodiments dealing with latches on the same logical net, latches on the same physical net, or a calculated proximity with respect to the latches.

FIG. 11B illustrates a first embodiment of the pre-diagnostic simulation step 1102 from FIG. 11A that performs a logical trace for a common clock or control signal to determine whether that common clock signal or common control signal could be defective. Given fail data for a device 1140, a determination is made as to whether a number of failing observation points is greater than a predetermined threshold 1142. If so, clock lines are traced or control signals are traced in the logical schematic 1144. A next determination is made as to whether there is one signal that connects all the failing observation points 1146. If so, then clock or control faults associated with the failing observation points are included as fault candidates 1148. Thereafter, the diagnostic simulation is continued 1150; this coincides with the "process during simulation" step 1104 of FIG. 11A.

FIG. 11C illustrates a second embodiment of the pre-diagnostic simulation step 1102 from FIG. 11A that performs a physical trace to determine whether a common clock signal or a common control signal could be defective. Given fail data for a device 1160, a determination is made as to whether a number of failing observation points is greater than a predetermined threshold 1162. If so, clock lines or control signals are traced in the physical domain 1164. This may be accomplished though a dictionary look-up table where nodes are identified with particular clock and/or control signals. A next determination is made of whether there is one net that connects all the observation points 1166. If so, then clock or control faults associated with the failing observation points are included as fault candidates 1168. Thereafter, the diagnostic simulation is continued 1170; this coincides with the "process during simulation" step 1104 of FIG. 11A.

FIG. 11D illustrates a third embodiment of the pre-diagnostic simulation step 1102 from FIG. 11A depicting a heuristic method to determine whether a common clock signal or a common control signal could be defective. Fail data 1180 for a device is analyzed as to whether a certain number of observation points are greater than a predetermined threshold 1182. If the predetermined threshold is met, proximity measures are calculated 1184 based on physical placement and proximity of the observation points, for example, dictionary defined bounding boxes or distances between latches. If the observe points are within the calculated proximity limits or fulfill the proximity criteria 1186, then clock or control signal faults associated with observation points are included in the fault candidate list 1188 and diagnostic simulation 1190 continues. Proximity may be determined by a dictionary approach that looks up latch locations, or by identifying elements using tracing of the logical or physical netlists. Thereafter, the diagnostic simulation is continued 1190; this coincides with the "process during simulation" step 1104 of FIG. 11A.

Figure 12:
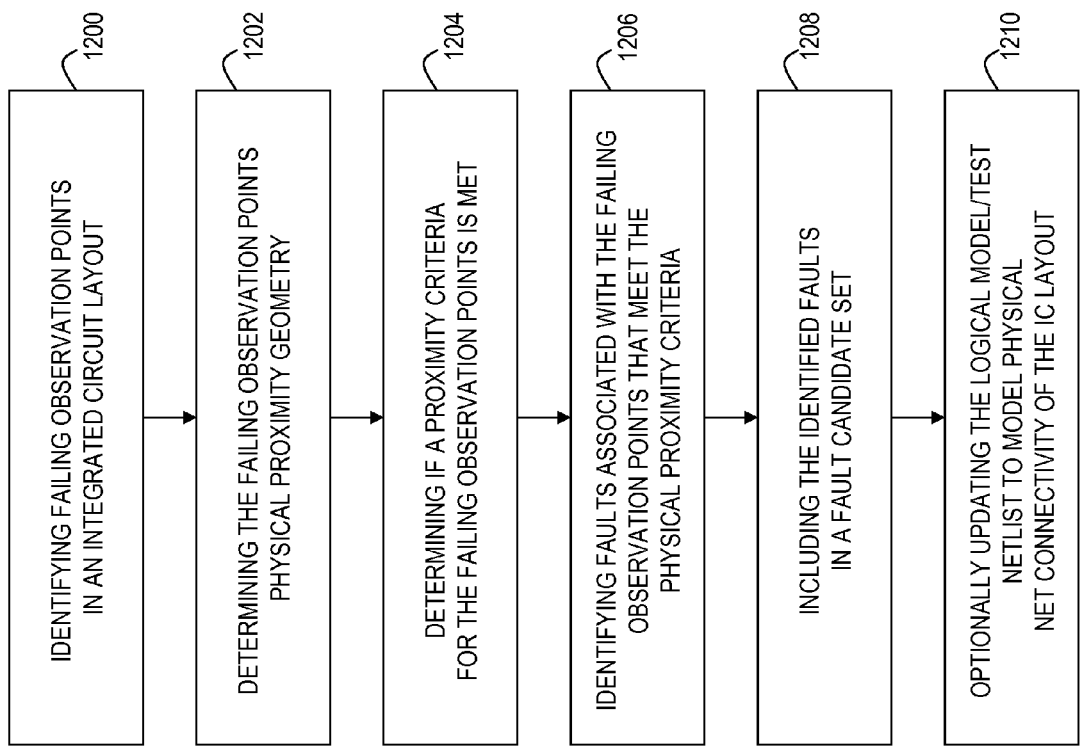
FIG. 12 illustrates a method of using physical proximity to select faults.

FIG. 12 illustrates a computer-implemented method of using proximity to identify candidate faults for diagnostic simulation. Failing observation points in an IC layout 1200 are identified and the failing observation point's physical proximity geometry in the IC circuit layout 1202 is determined. The physical proximity criteria for the failing observation points is applied 1204. If it is met, then faults associated with the failing observation points that meet the physical proximity criteria are determined 1206 and included in the fault candidate set 1208. As an optional step, the logic model and/or test netlist may be updated to model physical net connectivity of nets associated with the failing observation points 1210.

The method of determining the physical proximity geometry may further include calculating a boundary around which the all failing observation points are included within, or calculating a predetermined physical distance between latches, or grouping failing observation points based on location in the layout and applying the proximity criteria to each group separately.

The embodiments of the invention can take the form of an entirely hardware embodiment, an entirely software embodiment or an embodiment including both hardware and software elements. One embodiment of the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments of the invention is depicted in FIG. 13. This schematic drawing illustrates a hardware configuration of an information handling/computer system in accordance with the embodiments of the invention. The system comprises at least one processor or central processing units (CPU) 1310*a* and 1310*b*. The CPUs 1310*a* and 1310*b* are interconnected via system bus 1312 to various devices such as a random access memory (RAM) 1314, read-only memory (ROM) 1316, and an input/output (I/O) adapter 1318. The I/O adapter 1318 can connect to peripheral devices, such as disk units 1321 and tape drives 1340, or other program storage devices that are readable by the system. The system can read the inventive instructions on the program storage devices and follow these instructions to execute the methodology of the embodiments of the invention. The system further includes a user interface adapter 1322 that connects a keyboard 1324, mouse 1326, speaker 1328, microphone 1332, and/or other user interface devices such as a touch screen device (not shown) to the bus 1312 to gather user input. Additionally, a communication adapter 1334 connects the bus 1312 to a data processing network, and a display adapter 1336 connects the bus 1312 to a display device 1338 which may be embodied as an output device such as a monitor, printer 1339, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the embodiments of the invention have been presented for purposes of illustration and description, but is not intended to be exhaustive or limited to the embodiments of the invention in the form disclosed. Many modifications and variations will be apparent to those of ordinary skill in the art without departing from the scope and spirit of the embodiments of the present invention. The embodiments were chosen and described in order to best explain the principles of the embodiments of the invention and the practical application, and to enable others of ordinary skill in the art to understand the embodiments of the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the embodiments of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-implemented method of selecting fault candidates based on the physical layout of an Integrated Circuit (IC), said method comprising:
    identifying, by a computing device, failing observation points in an IC layout, said failing observation points comprising latches and test points;
    determining, by said computing device, proximity geometry of said failing observation points in said IC layout;
    determining, by said computing device, if a proximity criteria for said failing observation points is met, based on said proximity geometry;
    identifying, by said computing device, faults associated with said failing observation points that meet said proximity criteria; and
    including, by said computing device, said faults associated with said failing observation points that meet said proximity criteria in a fault candidate set.

2. The method according to claim 1, said determining said proximity geometry further comprising:
    calculating, by said computing device, a boundary around which said failing observation points are included within.

3. The method according to claim 1, said determining said proximity geometry further comprising:
    calculating, by said computing device, physical distances between said failing observation points.

4. The method according to claim 1, further comprising:
    identifying, by said computing device, faults in one of a logic model and a test netlist associated with said failing observation points and including said faults in said fault candidate set.

5. The method according to claim 1, further comprising:
    updating, by said computing device, one of a logic model and a test netlist to model physical net connectivity of nets associated with said failing observation points.

6. The method according to claim 5, said fault candidates based on said physical layout of said IC comprising faults associated with one of a clock signal, a control circuit signal and a circuit.

7. The method according to claim 1, further comprising:
    identifying, by said computing device, failing observation points associated with a common signal.

8. The method according to claim 1, said determining said proximity geometry further comprising:
    retrieving, by said computing device, failing observation point locations from one of a cross-reference lookup and a dictionary.

9. A computer-implemented method comprising:
    determining, by a computing device, net connectivity of a circuit using layout extraction;
    determining, by said computing device, a buffer insertion point based on said net connectivity;
    inserting, by said computing device, a buffer model at said buffer insertion point in a test netlist; and,
    updating, by said computing device, a fault model based on said test netlist with said buffer model inserted at said buffer insertion point.

10. The method according to claim 9, said determining said buffer insertion point further comprising:
    starting at one of a net source and a driver, identifying, by said computing device, a first downstream net branch point.

11. The method according to claim 10, said determining said buffer insertion point further comprising:
    determining, by said computing device, if said first downstream net branch point contains more than one fanout, and
    determining, by said computing device, a buffer insertion point at each downstream net branch point with more than one fanout.

12. The method according to claim 11, said determining said buffer insertion point further comprising:
    starting at said buffer insertion point at each downstream net branch with more than one fanout, identifying, by said computing device, a second downstream net branch point.

13. The method according to claim 12, said determining said buffer insertion point further comprising:

determining, by said computing device, whether said second downstream net branch point contains more than one fanout.

14. The method according to claim 13, said determining said buffer insertion point further comprising:
determining, by said computing device, a buffer insertion point at each downstream net branch point with more than one fanout.

15. The method according to claim 9, said determining said net connectivity of said circuit using layout extraction further comprising:
building, by said computing device, a connectivity network of said circuit as a graph.

16. A computer-implemented method comprising:
performing, by a computing device, a conetrace on a logic test netlist of an Integrated Circuit (IC) with fail data to identify one of fail faults, nets and instances within said IC;
determining, by said computing device, net connectivity of fail candidates using layout extraction;
determining, by said computing device, a buffer insertion point within said IC based on said net connectivity;
inserting, by said computing device, a buffer model at said buffer insertion point in said logic test netlist;
updating, by said computing device, a fault model based on said logic test netlist; and
outputting, by said computing device, a diagnostic result based on a diagnostic simulation of said fault model that has been updated.

17. The method according to claim 16, said determining said buffer insertion point further comprising:
starting at one of a net source and a driver, identifying, by said computing device, a first downstream net branch point;
determining, by said computing device, if said first downstream net branch point contains more than one fanout; and
determining, by said computing device, said buffer insertion point at each downstream net branch point with more than one fanout.

18. The method according to claim 16, said determining said buffer insertion point further comprising:
starting at said buffer model inserted at said buffer insertion point, identify, by said computing device, another downstream net branch point;
determining, by said computing device, if said another downstream net branch point contains more than one fanout; and
determining, by said computing device, a buffer insertion point at each downstream net branch point with more than one fanout.

19. The method according to claim 16, said determining net connectivity of a circuit using layout extraction further comprising:
building, by said computing device, a connectivity network of said circuit as a graph.

20. The method according to claim 19, said graph comprising nodes representing layout segments, including net drivers and sinks, and lines representing connections between said nodes, and
each said inserted buffer being associated with said layout segments.

21. A non-transitory computer readable medium containing instructions stored therein for causing a computer processor to perform steps of:
identifying failing observation points in an Integrated Circuit (IC) layout, said failing observation points comprising latches and test points;
determining proximity geometry of said failing observation points in said IC layout;
determining if a proximity criteria for said failing observation points is met, based on said proximity geometry;
identifying faults associated with said failing observation points that meet said proximity criteria; and
including said faults associated with said failing observation points that meet said proximity criteria in a fault candidate set.

22. The non-transitory computer readable medium according to claim 21, said determining said proximity geometry further comprising:
calculating a boundary around which said failing observation points are included within.

23. The non-transitory computer readable medium according to claim 21, said determining said proximity geometry further comprising:
calculating physical distances between said failing observation points.

24. The non-transitory computer readable medium according to claim 21, further comprising:
identifying faults in one of a logic model and a test netlist associated with said failing observation points and including said faults in said fault candidate set.

25. The non-transitory computer readable medium according to claim 21, further comprising:
updating one of a logic model and a test netlist to model physical net connectivity of nets associated with said failing observation points.

* * * * *